(12) United States Patent
Godau et al.

(10) Patent No.: US 9,358,720 B2
(45) Date of Patent: Jun. 7, 2016

(54) METHOD AND DEVICE FOR BLOW-MOLDING CONTAINERS

(75) Inventors: Günther Godau, Hamburg (DE); Michael Linke, Hamburg (DE); Dieter Klatt, Hamburg (DE); Michael Litzenberg, Geesthacht (DE); Karl-Heinz Balkau, Oststeinbek (DE)

(73) Assignee: KHS CORPOPLAST GMBH, Hamburg (DE)

( * ) Notice: Subject to any disclaimer, the term of this patent is extended or adjusted under 35 U.S.C. 154(b) by 775 days.

(21) Appl. No.: 13/577,790

(22) PCT Filed: Jan. 17, 2011

(86) PCT No.: PCT/DE2011/000047
§ 371 (c)(1),
(2), (4) Date: Aug. 8, 2012

(87) PCT Pub. No.: WO2011/095151
PCT Pub. Date: Aug. 11, 2011

(65) Prior Publication Data
US 2012/0299225 A1 Nov. 29, 2012

(30) Foreign Application Priority Data
Feb. 8, 2010 (DE) .......................... 10 2010 007 542

(51) Int. Cl.
*B29C 49/66* (2006.01)
*B29C 49/06* (2006.01)
*B29C 49/12* (2006.01)
*B29C 49/60* (2006.01)

(52) U.S. Cl.
CPC ................ *B29C 49/66* (2013.01); *B29C 49/06* (2013.01); *B29C 49/12* (2013.01); *B29C 2049/6027* (2013.01); *B29C 2049/6615* (2013.01); *Y02P 70/271* (2015.11)

(58) Field of Classification Search
CPC ............ B29C 49/66; B29C 2049/6607; B29C 2049/6615
See application file for complete search history.

(56) References Cited

U.S. PATENT DOCUMENTS

| 4,076,071 A | 2/1978 | Rosenkranz et al. |
| 5,182,122 A * | 1/1993 | Uehara ................... B29C 49/58 264/528 |
| 5,229,043 A | 7/1993 | Lee |
| 5,346,386 A | 9/1994 | Albrecht et al. |
| 5,648,026 A | 7/1997 | Weiss |

(Continued)

FOREIGN PATENT DOCUMENTS

| CA | 2145208 | 2/1995 |
| CN | 1076155 A | 9/1993 |

(Continued)

*Primary Examiner* — James Sanders
(74) *Attorney, Agent, or Firm* — Lucas & Mercanti, LLP; Klaus P. Stoffel (57) ABSTRACT

The invention relates to a method and device used to blow-mold containers. After thermal conditioning, a preform is shaped into the container inside a blow mold by the effect of blowing pressure. Required blowing gas is introduced into an interior of the preform through a connecting element. After the blow-molding, a purging gas is conducted through the interior of the container. A plurality of blowing stations are used, and, for at least one of the blowing stations, at least part of the required amount of the purging gas is stored in a storage volume associated only with said blowing station.

6 Claims, 11 Drawing Sheets

(56) References Cited

U.S. PATENT DOCUMENTS

| | | | |
|---|---|---|---|
| 6,423,253 B1 | 7/2002 | Bunel et al. | |
| 7,892,477 B2 | 2/2011 | Hirdina | |
| 2005/0046085 A1* | 3/2005 | Voth | B29C 49/6436 264/346 |
| 2005/0129888 A1 | 6/2005 | Kwon | |
| 2009/0278288 A1 | 11/2009 | Haesendonckx et al. | |
| 2010/0276849 A1 | 11/2010 | Derrien et al. | |

FOREIGN PATENT DOCUMENTS

| | | |
|---|---|---|
| CN | 2451319 Y | 10/2001 |
| CN | 101027178 A | 8/2007 |
| DE | 2352926 D | 4/1975 |
| DE | 4212583 D | 10/1993 |
| DE | 4325559 Y | 2/1994 |
| DE | 4340291 D | 6/1995 |
| DE | 19906438 D | 8/2000 |
| DE | 1934320 Y | 1/2001 |
| DE | 102006032140 X | 2/2008 |
| DE | 202004021477 A | 4/2008 |
| FR | 2921293 A | 3/2009 |
| JP | H07156260 A | 6/1995 |
| JP | 2001510745 A | 8/2001 |
| JP | 2007530314 A | 11/2007 |

* cited by examiner

METHOD AND DEVICE FOR BLOW-MOLDING CONTAINERS

The present application is a 371 of International application PCT/DE2011/000047, filed Jan. 17, 2011, which claims priority of DE 10 2010 007 542.6, filed Feb. 8, 2010, the priority of these applications is hereby claimed and these applications are incorporated herein by reference.

BACKGROUND OF THE INVENTION

The invention relates to a method for blow molding containers, wherein a preform is deformed after thermal conditioning within a blow mold, arranged in the area of a blow molding station, by the influence of blow molding pressure in the container, and wherein a blow molding gas is conducted through a connecting element into the interior of the preform and wherein, after blow molding, a rinsing gas is conducted through the interior of the container, and wherein a plurality of blow molding stations are used.

Moreover, the invention relates to a device for blow molding containers which includes at least two blow molding stations which each have at least one blow mold, and in which a flow path for a blow molding gas for blow molding the containers extends through a connecting element, and in which the blow molding stations are connected to a device for supplying a rinsing gas.

When the containers are formed by the influence of blow molding pressure, preforms of a thermoplastic material, for example, preforms of PET (polyethylene terephthalate), are fed within a blow molding machine to different processing stations. Typically, such a blow molding machine includes a heating device, as well as a blow molding device in whose area the previously thermally conditioned preform is expanded into a container by biaxial orientation. The expansion takes place by means of compressed air which is conducted into the preform to be expanded. The sequence in such an expansion of the preform is explained in DE-OS 43 40 291 with respect to method technology. The introduction of the pressurized gas mentioned in the beginning also includes the introduction of compressed gas into the developing container bubble, as well as the introduction of compressed gas into the preform at the beginning of the blow molding process.

The basic construction of a blow molding station for the container deformation is described in DE-OS 42 12 583. Possibilities for thermally conditioning the preforms are explained in DE-OS 23 52 926.

The preforms, as well as the blow molded containers, can be transported within the device for blow molding by means of different manipulating devices. The use of transporting mandrels on which the preforms are placed has been found particularly useful. However, the preforms can also be manipulated with other support devices. The use of gripping tongs for manipulating preforms and the use of expanding mandrels, which can be inserted for support in an area of the opening of the preform, are also among the available constructions.

A manipulation of containers using transfer wheels is described, for example, in DE-OS 199 06 438, in an arrangement of the transfer wheel between a blow molding wheel and a delivery section.

The manipulation of preforms already mentioned above takes place, on the one hand, in the so-called two-stage method, in which the preforms are initially manufactured by an injection molding process, are subsequently intermediately stored and are only later conditioned with respect to their temperature and blown into a container. On the other hand, the manipulation takes place in the so-called single-stage methods in which the preforms are suitably thermally conditioned an subsequently blown up, immediately following their production by means of injection molding and a sufficient solidification.

With respect to the blow molding stations used, various embodiments are known in the art. In blow molding stations which are mounted on rotating transport wheels, a book-like opening of the mold carriers can be frequently found. However, it is also possible to use mold carriers which are slidable relative to each other, or are guided in some other manner. In stationary blow molding stations, particularly those suitable for accommodating several cavities for the formation of containers, typically plates that extend parallel to each other are used as mold carriers.

Particularly in the manufacture of containers which are intended for having hot liquids filled into the, blow molds are used which have a temperature above an ambient temperature. These hot blow molds have the result that solidification of the material of the blow molded containers takes place only relatively slowly. Therefore, after carrying out the blow molding process, in such manufacturing methods frequently a rinsing gas is introduced into the container which causes cooling of the container walls, and thereby reinforces a faster removal of the finished containers out of the blow mold.

Such a rinsing air can be supplied, for example, through a hollow stretching rod which is provided with corresponding discharge openings. However, basically other variations for supplying the rinsing gas are possible. For controlling the supply of rinsing gas, usually special lines and valve circuits are used. Moreover, frequently a pressure level is predetermined for the rinsing gas which neither corresponds to a conventional low preliminary blowing pressure, nor to a higher principal blowing pressure. Consequently, the corresponding pressure level has to be made available separately through pressure regulators or additionally separately from the other pressures. Consequently, compared to a standard machine, the supply of the rinsing gas requires significant modifications with respect to device technology, or complete control units which are specialized for the respective application must be made available.

SUMMARY OF THE INVENTION

Therefore, it is the object of the present invention to improve a method of the type described above in which an economical realization with respect to device technology is reinforced.

In accordance with the invention, this object is met in that for at least one of the blow molding stations, at least a portion of the required quantity of rinsing gas is stored in a storage volume exclusively assigned to this blow molding station.

Another object of the present invention is to construct a device of the type mentioned above in such a way that a simpler structural configuration is obtained.

This object is met in accordance with the invention by connecting at least one of the blow molding stations to a storage for at least a portion of the rinsing gas assigned to just this blow molding station.

By assigning an individual storage to each blow molding station, a very modular construction of the blow molding device is facilitated. In particular, it is possible to construct the blow molding device substantially in accordance with a basic standard, and to supplement this basic construction with additional required components only in the case that it is necessary to make the rinsing gas available This facilitates a first assembly as well as any retrofitting of a standard machine.

Additionally, by assigning an individual storage to each blow molding station, any complex circuitry or couplings of the blow molding stations are prevented.

A separate control for filling the storage becomes unnecessary by carrying out at least a partial filling of the storage volume with the rinsing gas while the blow molding process is carried out.

A particularly simple structural realization is reinforced by the fact that at least a partial filling of the storage volume takes place through a flow connection of the storage volume with an interior space of the container.

A simple possibility for cooling the storage is achieved by filling at least a portion of the storage volume with compressed gas through an inlet valve.

A controlled filling and emptying of the storage is reinforced by controlled feeding of pressurized gas into the storage volume, as well as a discharge of a pressurized gas out of the storage volume, respectively through at least one valve each.

Movable feeding elements can be avoided by conducting the rinsing gas laterally through a wall of a stretching rod in an inner space of the stretching rod.

A simplified embodiment is made available by supplying the rinsing gas to stretching rod by means of a hose.

BRIEF DESCRIPTION OF THE DRAWING

In the drawings embodiments of the invention are schematically illustrated. In the drawing.

DETAILED DESCRIPTION OF THE INVENTION

Figure 1:
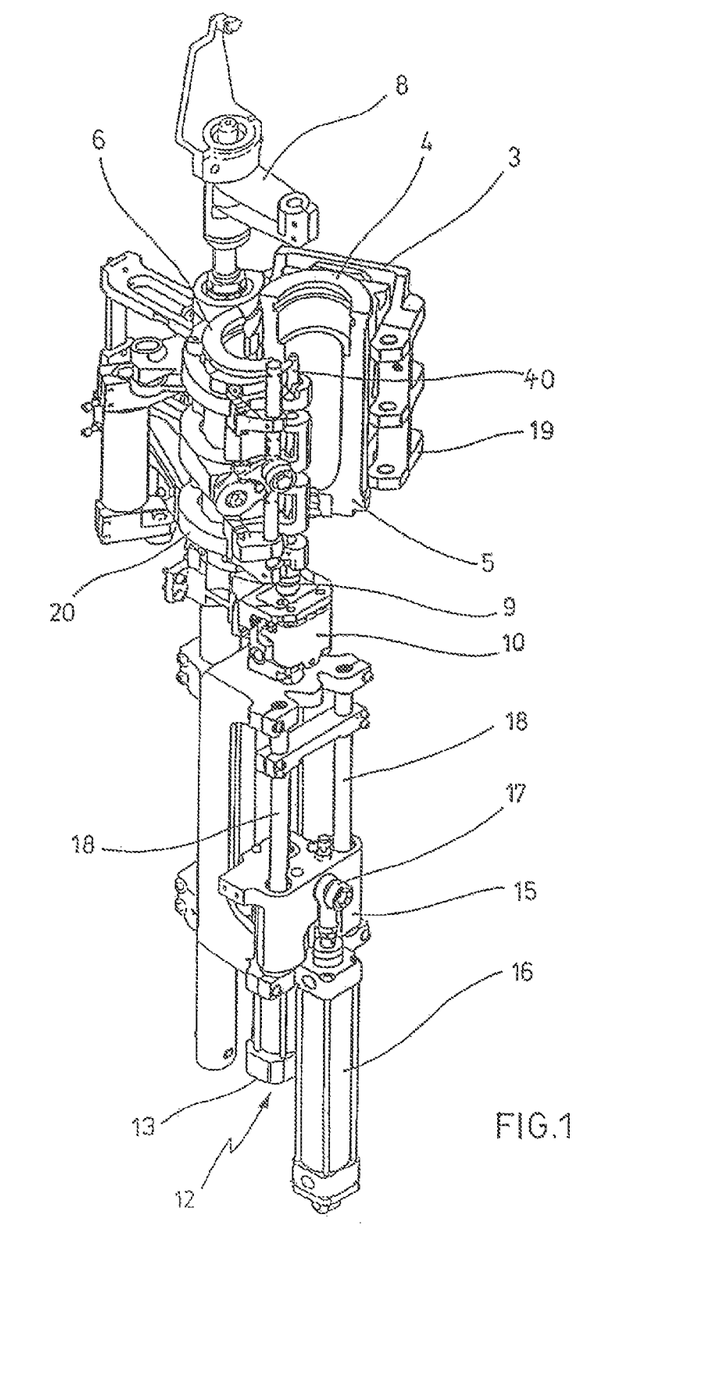
FIG. 1 is a perspective illustration of a blow molding station for manufacturing containers from preforms.
Figure 2:
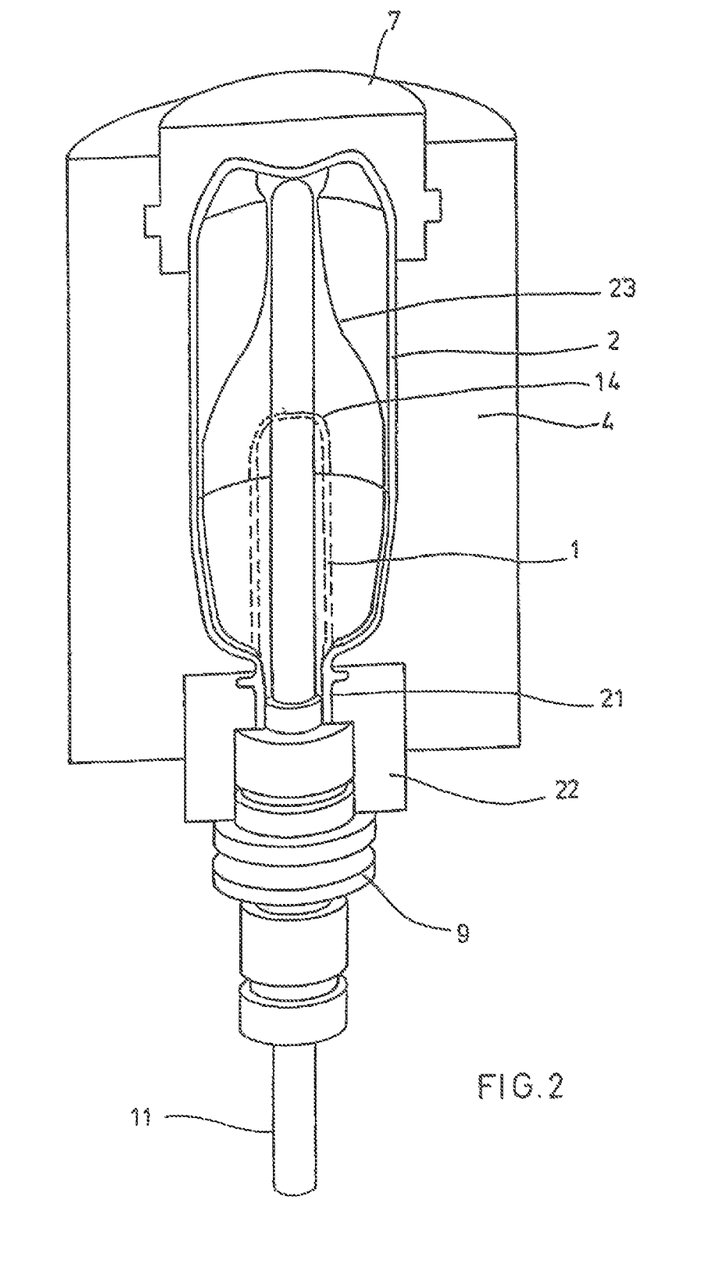
FIG. 2 shows a longitudinal sectional view through a blow mold in which a preform is stretched and expanded.

The principal construction of a device for deforming preforms 1 into containers 2 is illustrated in FIG. 1 and FIG. 2.

The device for forming containers 2 consists essentially of a blow molding station 3 which is provided with a blow mold 4 into which a preform 1 can be placed. The preform 1 may be an injection molded piece of polyethylene terephthalate. For facilitating placement of the preform 1 in the blow mold 4 and for facilitating removal of the finished container 2, the blow mold 4 is composed of mold halves 5, 6 and a bottom part 7, which can be positioned by a lifting device 8. The preform 1 can be held in the area of the blow molding station 3 by a transport mandrel 9, which together with the preform 1, travels through a plurality of treatment stations within the device. However, it is also possible to place the preform 1, for example, though tongs or other manipulating means directly into the blow mold 4.

For facilitating a supply of compressed air, a connecting piston 10 is arranged underneath the transport mandrel 9, wherein the connecting piston 10 supplies compressed air to the preform 1 and simultaneously carries out a sealing effect relative to the transport mandrel 9. However, in a modified construction it is basically also conceivable to use stationary compressed air supply lines.

Stretching of the preform 1 takes place in this embodiment by means of a stretching rod 11 which is positioned by means of a cylinder 12. In accordance with another embodiment, a mechanical positioning of the stretching rod 11 is effected through cam segments, which are acted upon by rollers. The use of cam segments is particularly useful, especially if a plurality of blow molding stations 3 is arranged on a rotating blow wheel.

In the embodiment illustrated in FIG. 1, the stretching system is constructed in such a way that a tandem arrangement of two cylinders 12 is made available. By means of a primary cylinder 13, initially the stretching rod 11 is moved up to the area of a bottom 14 of the preform 1 prior to the beginning of the actual stretching process. During the actual stretching procedure, the primary cylinder 13 is positioned with its stretching rod 11 in the extended position together with a carriage 15, supported by a secondary cylinder 16 or through a cam control. In particular, it is intended to use the secondary cylinder 16 with cam control in such a way that a guide roller 17, which during the stretching procedure slides along a curved path, predetermines an actual stretching position. The guide roller 17 is pressed by the secondary cylinder 16 against the guide track. The carriage 15 slides along two guide element 18.

After the mold halves 5, 6 arranged in the areas of supports 19, 20 are closed the supports 19, 20 are locked relative to each other by means of a locking device 20.

For adapting the different shapes of an opening section 21 of the preform 1, according to FIG. 2, the use of separate threaded inserts 22 is provided in the area of the blow mold 4.

FIG. 2 shows, in addition to the blow molded container 2 also shown in broken lines, the preform 1 and schematically a developing container bubble 23.

Figure 3:
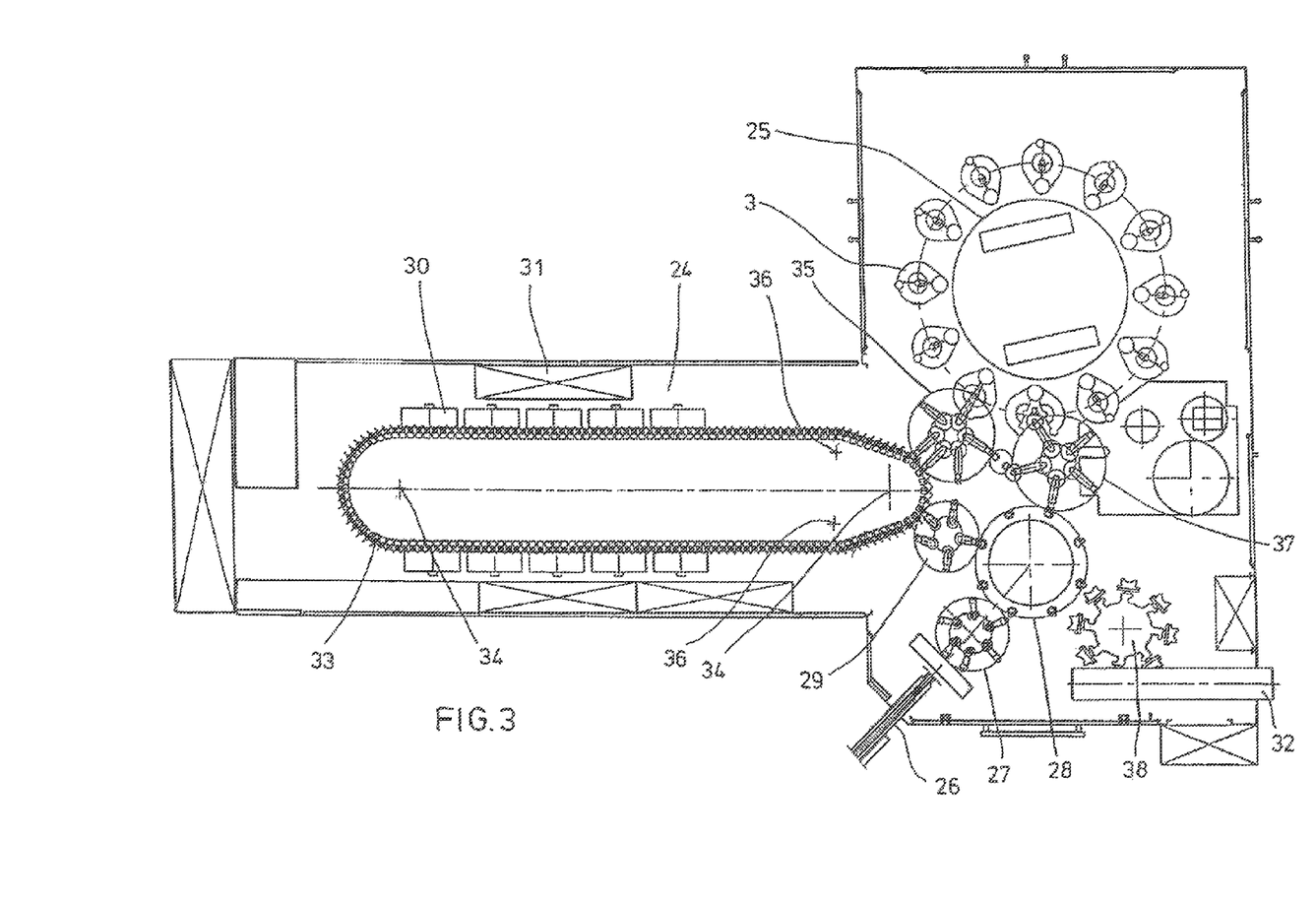
FIG. 3 is a sketch for illustrating a basic construction of a device for blow molding containers.

FIG. 3 shows the basic construction of a blow molding machine which is equipped with a heating section 24, as well as a rotatable blow wheel 25. Starting from a preform input 26, the preforms 1 are transported by transfer wheels 27, 28, 29 into the area of the heating section 24. Along the heating section 24, heating radiators 30 and blowers 31 are arranged for thermally conditioning the preforms 1. After the preforms 1 have been sufficiently thermally conditioned, the preforms 1 are transferred to the blow wheel 25 in whose area the blow molding stations 3 are arranged. The finished blow molded containers 2 are then fed by additional transfer wheels to a discharge section 32.

In order to be able to deform a preform 1 into a container 2 in such a way that the container 2 has material properties which ensure that the foodstuff filled into the containers 2, particularly beverages, last for a long time, special method steps must be adhered to when heating and orienting the preforms 1. Moreover, advantageous effects can be achieved by adhering to special dimensioning rules.

Different synthetic materials can be used as thermoplastic material. Capable of use are, for example, PET, PEN or PP.

The expansion of the preform 1 during the orienting process takes place by means of compressed air supply. The compressed air supply is divided into a preliminary blowing phase, at which gas, for example compressed air, having a lower pressure level is supplied, and a subsequent principal blowing phase in which gas is supplied at a higher pressure level. During the preliminary blowing phase, typically compressed air in the interval of 10 bar to 25 bar is supplied, while compressed air with a pressure in the interval of 25 bar to 40 bar is supplied during the principal blowing phase.

It can also be seen from FIG. 3 that in the illustrated embodiment the heating section 24 is composed of a plurality of transport elements 33, which are arranged in a row like a chain and are guided along by guide wheels 34. In particular, it is being considered to span, in view of the chain-like arrangement, an essentially rectangular basic contour. In the illustrated embodiment, in the area of an extension of the heating section 24, facing the transfer wheel 29 and a feeding wheel 35, a single guide wheel 34 having relatively large dimensions is used and, in the area of adjacent deflections two guide wheels 36 having relatively smaller dimensions are used. However, basically any other guides are also conceivable.

For facilitating an arrangement of the transfer wheel 29 and the feeding wheel 35, which is as tight as possible relative to each other, the illustrated arrangement has been found particularly useful because in the area of the respective extensions of the heating section 24, three guide wheels 34, 36 are positioned, with the respectively smaller guide wheels 35 being arranged in the area of the transfer to the linear patterns of the heating section 24 and the larger guide wheel 34 in the immediate transfer area to the transfer wheel 29 and the feeding wheel 35. As an alternative to the use of chain-like transport elements 33, it is also possible, for example, to use a rotating heating wheel.

After blowing of the containers 2 is concluded, the containers 2 are guided by a removal wheel 37 out of the area of the blow molding stations 3 and are transported through the transport wheel 28 and a discharge wheel 38 to the discharge section 32.

Figure 4:
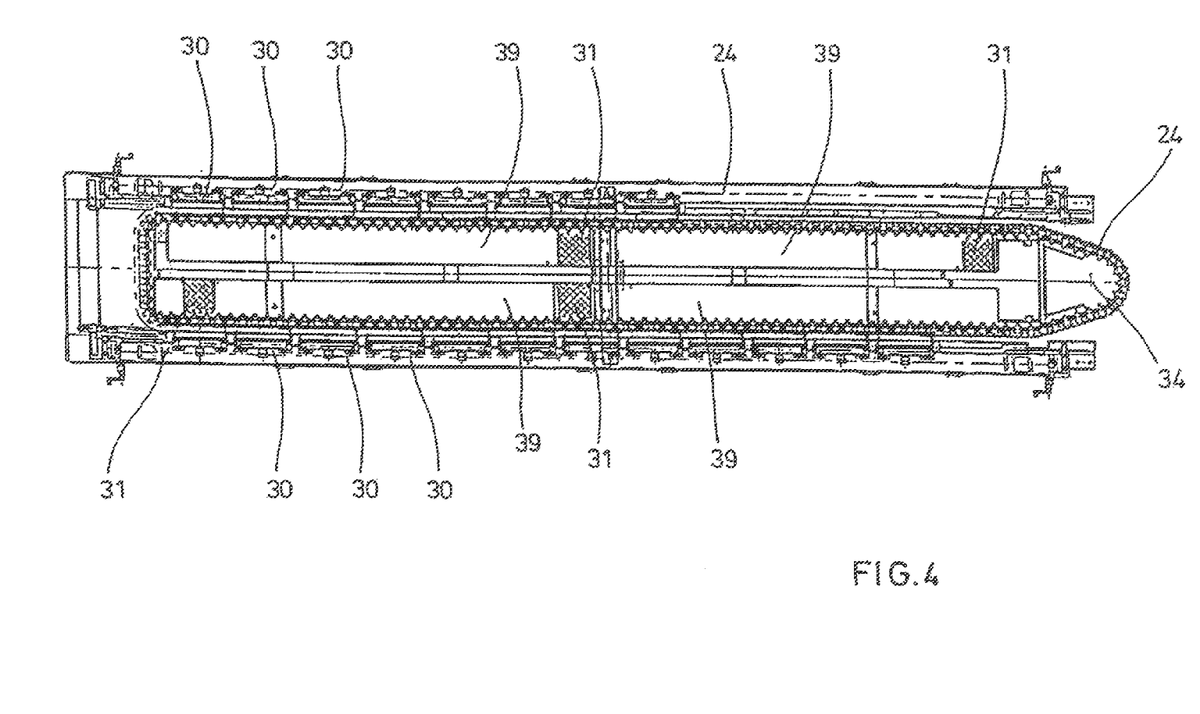
FIG. 4 shows a modified heating section with increased heating capacity.

In the modified heating section 24 illustrated in FIG. 4, a larger quantity of preforms 1 can be thermally conditioned per unit of time because of the greater number of heating radiators 30. The blowers 31 conduct, in this case, cooling air into the area of cooling air ducts 39 which are each located opposite the corresponding heating radiators 30, and discharge the cooling air through outlet openings. As a result of the arrangement of the discharge directions, a flow direction for the cooling air essentially transversely of a transport direction of the preforms 1, is realized. The cooling air ducts 39 can make available reflectors for the heating radiation in the areas of surfaces located opposite the heating radiators 30; it is also possible to realize cooling of the heating radiators 30 by means of the discharged cooling air.

Figure 5:
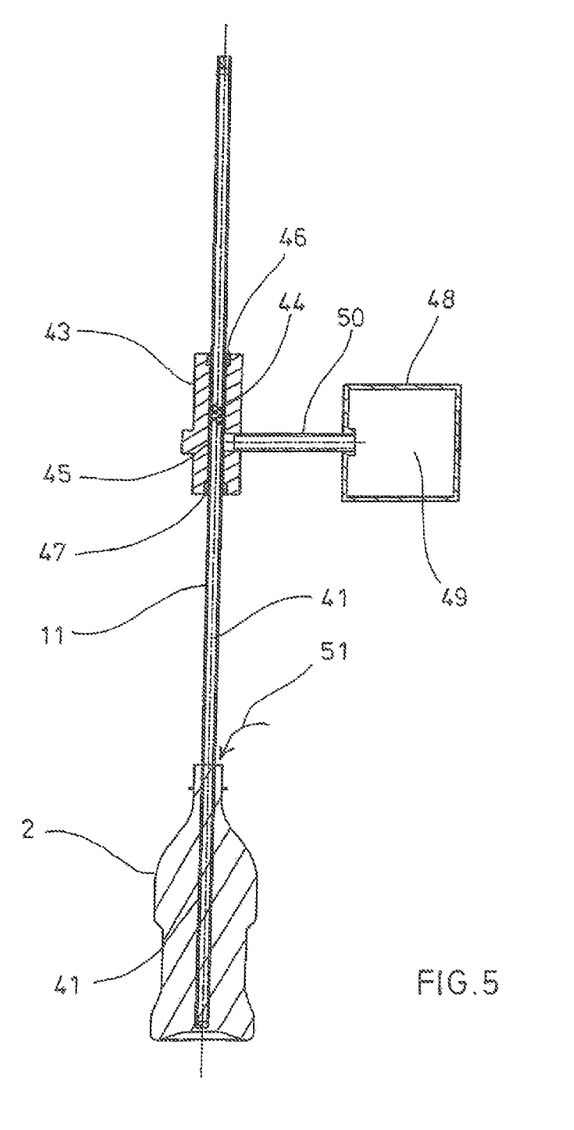
FIG. 5 is a schematic illustration of an embodiment with storage for the rinsing gas without valve circuitry.

FIG. 5 shows a finished blow molded container 2 into which the stretching rod 11 has been inserted. The stretching rod 11 is constructed so as to be hollow at least over portions thereof and includes an interior space 41. In the area of its expansion introduced into the container 2, the stretching rod 11 has at least one discharge opening 42, preferably a plurality of outlet openings 42. The stretching rod 11 extends through a guide element 43. In the embodiment illustrated in FIG. 5, the stretching rod 11 has inlet openings 44 which are arranged in the area of an interior space 45 of the guide element 43. The interior space 45 is sealed relative to the outside by means of seals 46, 47.

Storage 48 is connected to the interior space 45 of the guide element 43. The storage 48 includes an interior space 49. In the embodiment illustrated in FIG. 5, the storage 48 is connected to the guide element 43 through a tubular spacer element 50.

In accordance with the embodiment illustrated in FIG. 5, the blowing air required for the formation of the container 2 is supplied through an annular gap surrounding the stretching rod 11 into the interior space of the container 2 or of the preform 1. During forming of the container 2, the blowing air flows through the discharge openings 42 into the interior space 41 of the stretching rod 11, and reaches the interior space 45 through the inlet openings 44 and the interior space 45 up to the area of the inner space 49 of the storage 48. As a result, the storage 48 is filled with a quantity of compressed air which is exactly predetermined by the storage volume. The compressed air has a pressure which corresponds approximately to the maximum blowing pressure.

After an end of the blow molding process and a reduction of the pressure in the area of the container 2, this compressed air flows as rinsing gas out of the storage 48 and flows into the interior space of the container 2 over the outlet openings 42 of the stretching rod 11. This triggers the rinsing process, and especially cooling of the walls of the container 2.

The extremely simple structural principle can be seen especially in FIG. 5. The guide element 43 only has to be coupled to the storage 48 in order to implement the function of making the rinsing gas available. During operation no control functions are necessary because the system controls itself automatically.

In a variation of the embodiment, in which the flow gas is not supplied through the annular gap 51, but through the interior space 41 of the stretching rod 11, it is only required to provide the guide element 43 with an additional connection for supplying the blow gas. The functions are otherwise the same.

Figure 6:
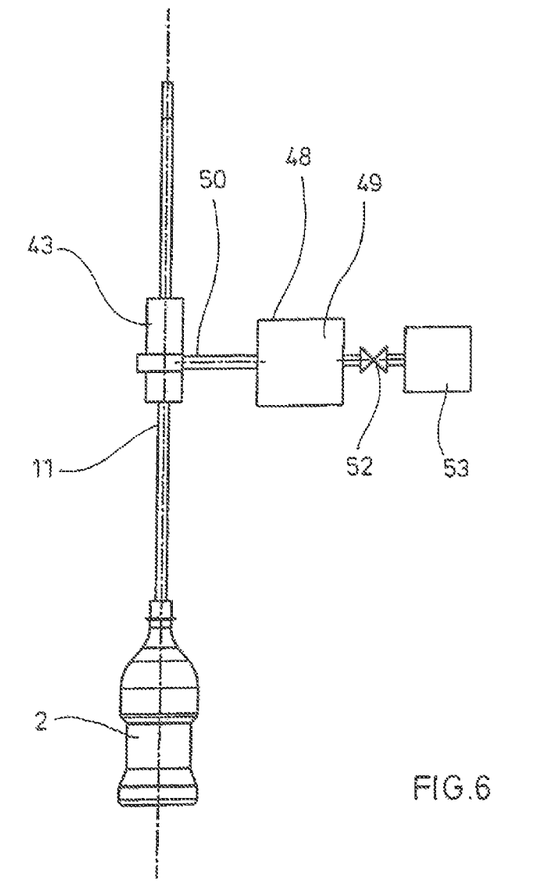
FIG. 6 shows an embodiment modified as compared to FIG. 5 with an additional entry valve for rinsing gas.

FIG. 6. shows an embodiment which is modified as compared to the embodiment of FIG. 5, wherein the storage 48 is additionally coupled through an inlet valve 52 to a compressed gas source 53. Typically, the compressed gas source 53 is identical to the compressed gas source for the higher blowing pressure. However, it is also possible to make available at least a portion of the required rinsing air by using spent blowing air.

It is possible to conduct already compressed gas, which is usually partially decompressed when flowing into the storage 48, through the inlet valves 52 into the storage 48. The decompression leads to a cooling of the gas and, thus, it is possible to predetermine cooling of the storage 48. Moreover, by using the inlet valve 52 it is possible to make available, as needed, a larger quantity of rinsing gas than is predetermined by the interior space 45 of the storage 48. Alternatively or as supplement, it is also possible to cool the storage through a separate cooling medium. For example, a metal housing of storage 48 can be provided with cooling ducts for a cooling fluid, for example, water.

Figure 7:
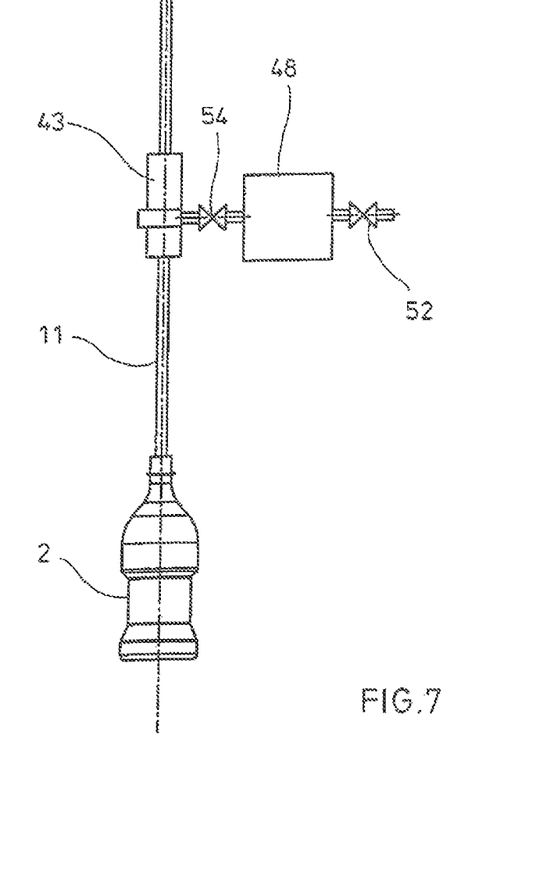
FIG. 7 shows a further modified embodiment with an additional valve for controlling the discharge of the rinsing gas.

In accordance with the embodiment of FIG. 7, in addition to the inlet valve 52 an outlet valve 54 is arranged in the area of the storage 48. The outlet valve 54 facilitates a metered addition of an exactly predetermined quantity of rinsing gas, even if the inlet valve 52 is used. This makes it possible to avoid making available an excessive amount of rinsing gas which would result in unnecessary costs.

Figure 8:
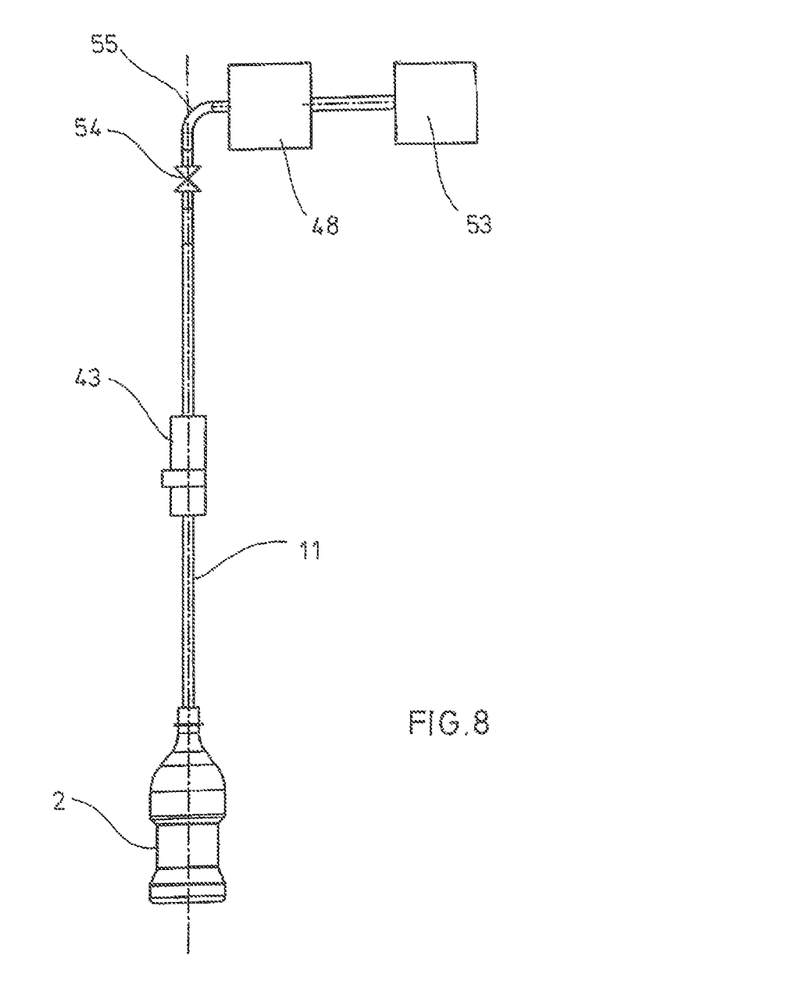
FIG. 8 shows a further modified embodiment, in which the storage and the stretching rod are connected to each other through a flexible hose.

FIG. 8 shows an embodiment in which the rinsing air is supplied to the interior space 41 of the stretching rod 11 by connecting the storage 48 to the stretching rod 11 through a hose 55 and not with the use of the guide elements 43. Typically, the hose 55 is connected to an end of the stretching rod 11 which faces away from the container 2.

FIG. 8 shows an embodiment in which the storage 48 is connected only to an outlet valve 54. In this embodiment, the outlet valve is arranged between the hose 55 and the stretching rod 11. According to another embodiment, not illustrated, it is possible to couple an inlet valve 52 to the storage 48 instead of the outlet valve 54.

Figure 9:
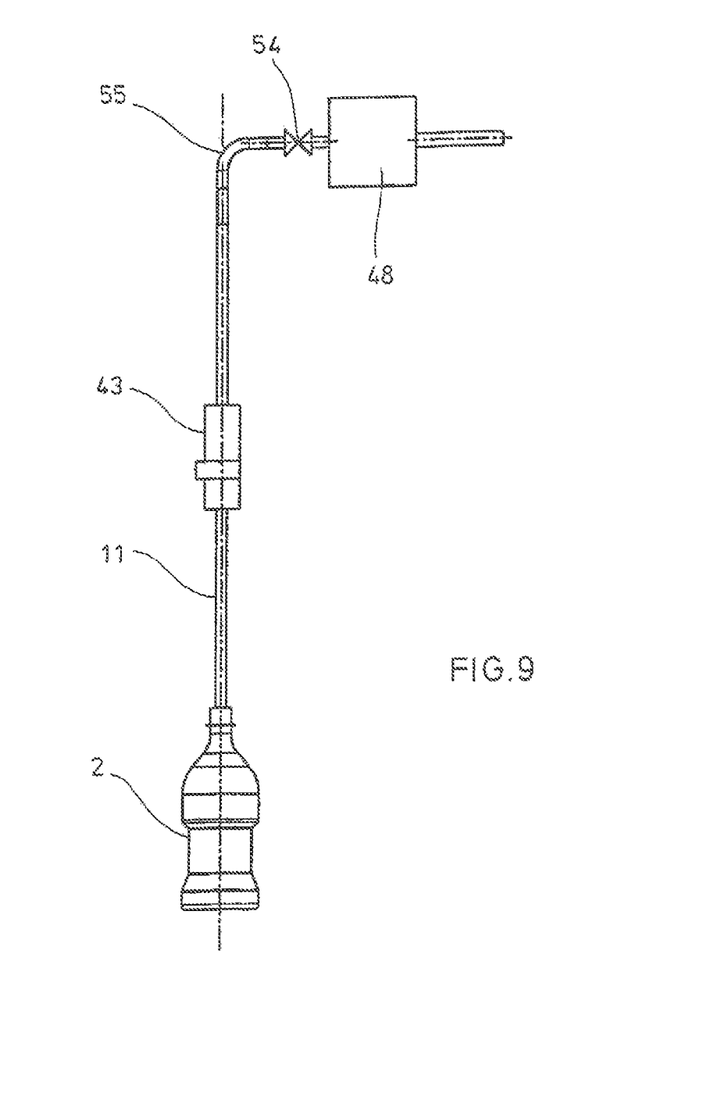
FIG. 9 shows a modification of the embodiment in FIG. 8 with a changed arrangement of the control valve.

In accordance with the embodiment variation in FIG. 9 the outlet valve 54, according to FIG. 8, was changed with respect to its positioning in such a way that it is now arranged between the hose 55 and the storage 48. Such an arrangement avoids the necessity of positioning the outlet valve 54 together with the stretching rod 11. Consequently, the outlet valve 54 is in this embodiment arranged so as to be stationary relative to the storage 48.

The blow molding station 3, prepared for carrying out the corresponding process, typically has the actual mold halves 5, 6 as well as outer shells arranged between the mold halves 5, 6 and the carriers 19, 20. Thermal conditioning agent ducts or heating elements are preferably arranged in the areas of these outer shells in order to reinforce a simple exchangeability of the mold halves 5, 6 in the case of a product change. In accordance with an embodiment for manufacturing containers 2, which can be filled hot, the outer shells are heated to a temperature of about 120° C. On the other hand, the bottom mold and the components surrounding the opening section 21 are cooled to a temperature of 12-14° C. By using the cooling of the blow molded container 2 by the rinsing air, it is only necessary to supply the thermal conditioning medium for heating the mold halves 5, 6 and for cooling the other structural components. On the other hand, it is not necessary to supply a third thermal conditioning medium in liquid form.

Figure 10:
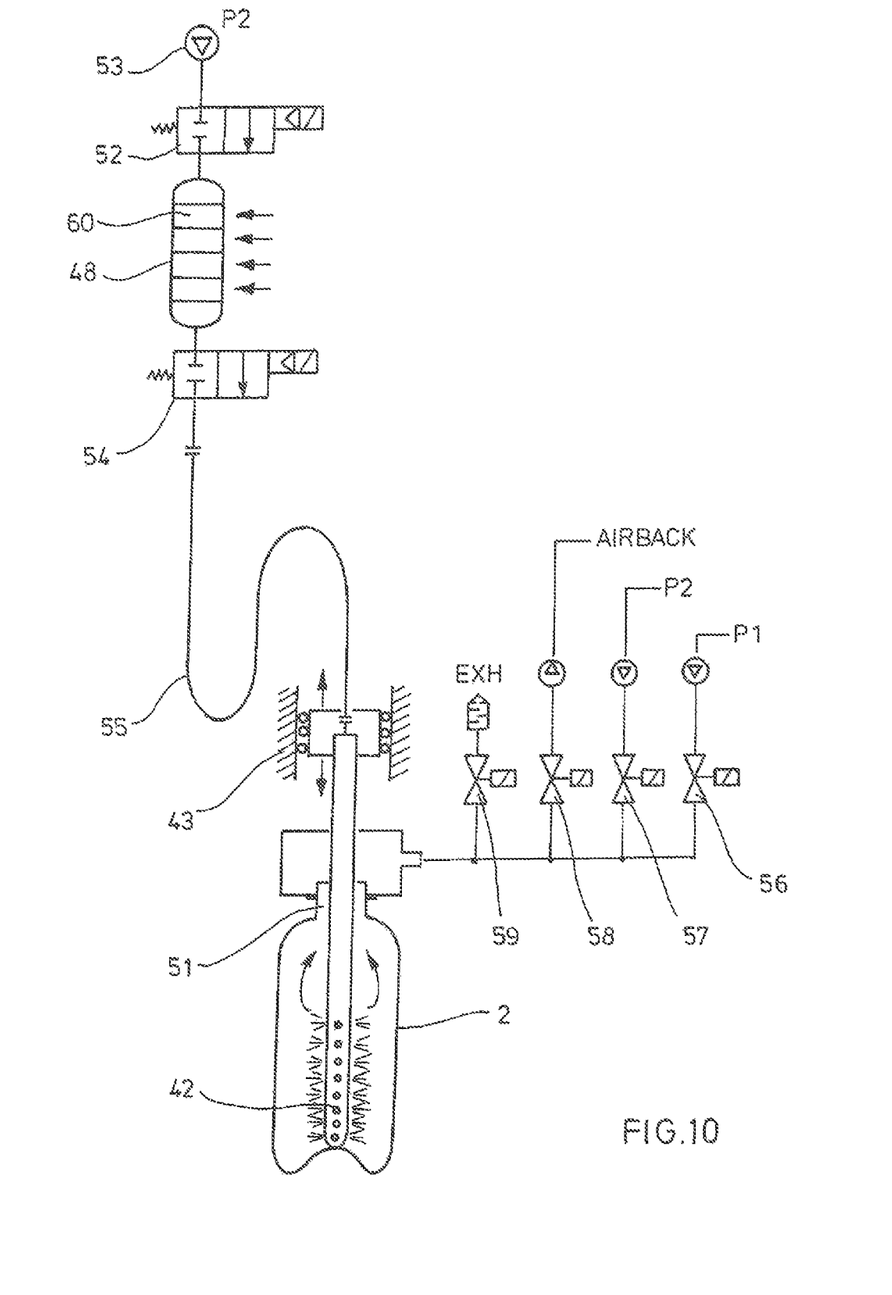
FIG. 10 shows another modification of the embodiments of FIG. 8 and FIG. 9 with the use of valves in the areas of an input as well as an output of the storage.

FIG. 10 shows an embodiment similar to the embodiments in FIG. 7 to FIG. 9. In this case, for example, the supply of the blow molding pressures is illustrated in more detail. The supply of a first preliminary blowing pressure P1 at a pressure level of 3 bar to 20 bar takes place through a preliminary pressure valve 56, and the supply of a principal blowing pressure P2 at a pressure of typically 20 bar to 40 bar takes place through a principal pressure valve 57. The return of spent blowing air is reinforced by a return valve 58. The release of blow molding air which is no longer required which is not discharged through the return valve 58 or guided to the storage 48, is possibly released through a ventilating valve 59.

In this embodiment, the storage 48 is provided with an inlet valve 52 as well as an outlet valve 54. When using the inlet valve 52, as well as the outlet valve 54, feeding of the storage 48 with blowing air flowing out of the interior of the container 2 can also be completely omitted. Consequently, depending on the type of use, the required quantity of rinsing gas with a content of rinsing gas of 0% to 100% can be made available by using the compressed gas source 53.

FIG. 10 further shows an embodiment in which the storage 48 consists of individual storage segments 60. These storage segments 60 can be individually activated in order to make available an optimum storage volume for the respective case of application. For example, it is possible to provide each of the individual storage segments 60 with a storage volume of 0.11. Activation can take place manually through check valves or through electrical controls.

Figure 11:
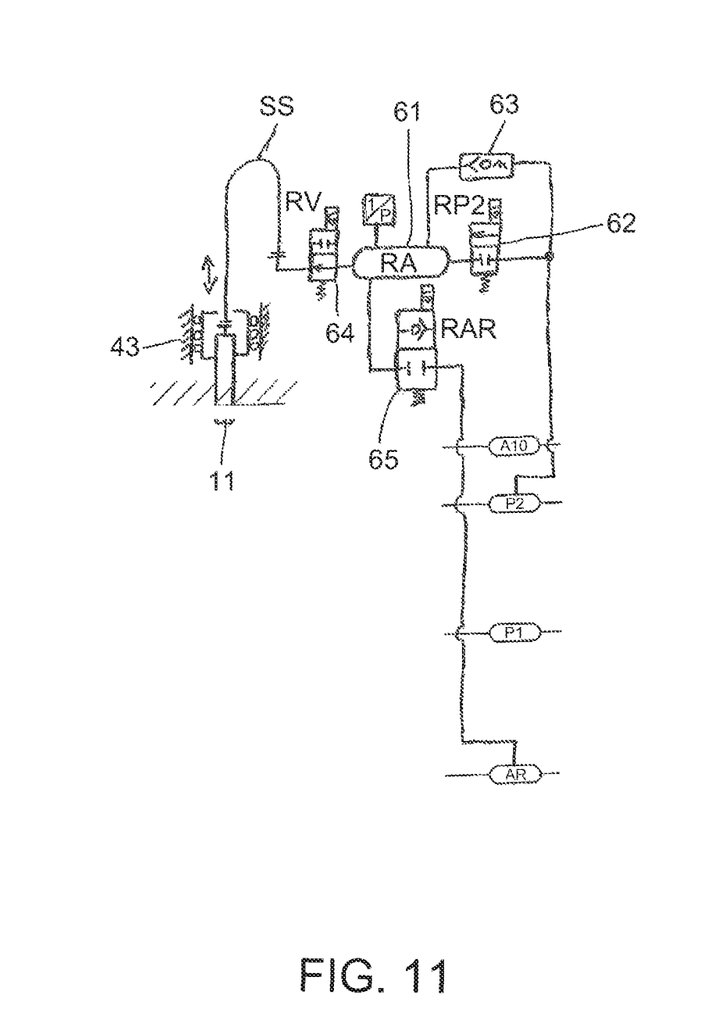
FIG. 11 is a schematic illustration concerning the pneumatic realization of a further embodiment with the use of used blowing air for carrying out the rinsing process.

In accordance with the embodiment in FIG. 11, used blowing air AR is supplied through a return valve 65 to a supply container 61. The supply container 61 serves as a compensation reservoir because the supply and the removal of the spent blowing air do not take place synchronously with respect to time. The supply container 61 is connected through a control valve 62 to a blowing pressure supply. This can be, for example, the blowing pressure supply for the higher blowing pressure. Consequently, the control valve 62 functionally corresponds to the valve 52 according to FIG. 10. The control valve 62 may be bridged by a check valve 63 which is closed when a lower pressure prevails in the supply container 61 than in the connected blowing pressure supply.

The supply tank 61 is connected through a rinsing valve 64 to the hollow stretching rod 11. The connection of the stretching rod 11 with the rinsing valve 64 is preferably effected through the hose 55.

In contrast to the embodiment in FIG. 10, in which the blowing pressure for forming the containers is supplied through the valves 56, 57, the supply of compressed gas for carrying out the rinsing process takes place through the control valve 62 shown in FIG. 11, and the supply of compressed gas for carrying out the rinsing process takes place corresponding to the function of the inlet valve 52 in FIG. 10. The return valve 58 in FIG. 10 serves for conducting spent blowing gas out of the container 2, and the return valve 65, according to FIG. 11, serves foe controlling the use of spent blowing gas for rinsing the finished blow molded container 2.

The invention claimed is:

1. A device for blow molding containers, comprising: at least two blow molding stations each with at least one blow mold; a connecting element having a flow path for a blow molding gas to form the containers; and a device for supplying a rinsing gas, the blow molding stations being connected to the device for supplying a rinsing gas, wherein at least one of the blow molding stations is connected to a storage for at least a portion of the rinsing gas, the storage being exclusively assigned to the at least one blow molding station, wherein the storage is provided with cooling.

2. The device according to claim 1, wherein the storage is connected to a compressed gas source through an inlet valve.

3. The device according to claim 1, further comprising an outlet valve arranged to connect the storage to an interior space of the container.

4. The device according to claim 1, wherein the storage is constructed as a reservoir for spent flowing air.

5. The device according to claim 1, wherein the device for supplying the rinsing gas is at least over portions constructed as a hollow stretching rod.

6. The device according to claim 5, further comprising a hose arranged to connect the stretching rod to the storage.

* * * * *